(12) United States Patent
Oliverio

(10) Patent No.: US 11,031,830 B2
(45) Date of Patent: *Jun. 8, 2021

(54) VEHICLE SYSTEM FOR PROVIDING WIFI TO MOBILE DEVICES WITHIN THE VEHICLE

(71) Applicant: Nissan North America, Inc., Franklin, TN (US)

(72) Inventor: Sean Oliverio, Wolverine Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/360,289

(22) Filed: Mar. 21, 2019

(65) Prior Publication Data

US 2019/0222074 A1 Jul. 18, 2019

Related U.S. Application Data

(63) Continuation of application No. 15/481,124, filed on Apr. 6, 2017, now Pat. No. 10,284,027.

(51) Int. Cl.

| H01M 10/46 | (2006.01) |
| H02J 50/90 | (2016.01) |
| B60R 16/03 | (2006.01) |
| H02J 50/30 | (2016.01) |
| H02J 7/02 | (2016.01) |
| H04W 84/12 | (2009.01) |

(52) U.S. Cl.
CPC ............. *H02J 50/90* (2016.02); *B60R 16/03* (2013.01); *H02J 50/30* (2016.02); *H02J 7/025* (2013.01); *H04W 84/12* (2013.01)

(58) Field of Classification Search
CPC .. H02J 7/355; H02J 7/0042; H02J 7/35; H02J 7/025; H02J 50/15; H02J 50/20; H02J 50/30; H02J 50/40; H02J 50/90; H02J 2310/46; H04W 84/12; B60R 16/03
USPC ........ 320/101, 104, 107, 114, 115; 362/487, 362/488, 489; 136/244, 293
See application file for complete search history.

(56) References Cited

U.S. PATENT DOCUMENTS

| 7,236,776 B2 | 6/2007 | Nath et al. |
| 7,323,849 B1 | 1/2008 | Robinett et al. |
| 8,422,951 B2 | 4/2013 | Nejad et al. |
| 10,284,027 B2* | 5/2019 | Oliverio .................. B60R 16/03 |
| 2004/0218766 A1 | 11/2004 | Angell et al. |
| 2014/0335902 A1* | 11/2014 | Guba ..................... H04W 4/027 455/456.4 |
| 2014/0376646 A1* | 12/2014 | Leabman ................ H02J 50/80 375/257 |
| 2015/0077065 A1 | 3/2015 | Haseltine et al. |
| 2017/0070066 A1 | 3/2017 | Ng |

* cited by examiner

*Primary Examiner* — Edward Tso
(74) *Attorney, Agent, or Firm* — Young Basile Hanlon & MacFarlane, P.C.

(57) ABSTRACT

A vehicle system for providing a service to a mobile device includes a WiFi emitter configured to emit a plurality of WiFi signals, each of the plurality of WiFi signals corresponding to a respective zone within the vehicle, and a WiFi control module that selectively controls the WiFi emitter to emit one or more signals to respective zones. Each zone corresponds to a particular occupant area within the vehicle.

20 Claims, 6 Drawing Sheets

VEHICLE SYSTEM FOR PROVIDING WIFI TO MOBILE DEVICES WITHIN THE VEHICLE

CROSS-REFERENCE TO RELATED APPLICATION

This application is a continuation of U.S. patent application Ser. No. 15/481,124 filed on Apr. 6, 2017, the entirety of which is hereby incorporated by reference.

TECHNICAL FIELD

This disclosure relates to photonic charging of mobile devices having modular voltage storage cells capable of being charged.

BACKGROUND

Mobile devices are ubiquitous with a user's day-to-day activities. A mobile device typically includes a modular voltage storage cell, such as a rechargeable battery. A user of a mobile device typically recharges the modular voltage storage cell when the user has access to an electrical outlet, such as a wall outlet in a home or office or a power outlet such as in a vehicle.

The mobile device is then connected to a charging cable. The charging cable may be connected to a charging receptacle in the electrical outlet. The modular voltage storage cell may be replenished and/or charged while the mobile device is connected to the electrical outlet. In some situations, traditional charging methods, such as those described above, may be inconvenient. For example, more than one user may desire to change a mobile device at the same time, a single user may desire to charge more than one mobile device at the same time (e.g., a smartphone and a tablet), the user or users may not have access to proper charging cables and/or charging receptacles, or other suitable situations.

SUMMARY

Disclosed herein are aspects, features, elements, implementations, and embodiments of photonic charging of mobile devices.

An aspect of the disclosed embodiments is a system for providing photonic battery charging. The system may include: a narrow beam light control module that selectively controls at least one narrow beam light emitter; the at least one narrow beam light emitter configured to emit a focused narrow beam of light to a corresponding charging zone, the focused narrow beam of light having a frequency within a predetermined frequency range; and at least one indicator that displays a visual indication of a location of the corresponding charging zone.

Another aspect of the disclosed embodiments is a method for providing photonic battery charging. The method may include: providing a selectively controllable narrow beam light emitter; emitting, from the narrow beam light emitter, a focused narrow beam of light having a frequency within a predetermined frequency range; providing a charging zone corresponding to the focused narrow beam of light; and providing a visual indication of a location of the corresponding charging zone.

Another aspect of the disclosed embodiments is a vehicle that may include: a narrow beam light control module that selectively controls at least one narrow beam light emitter disposed on a first portion of a vehicle; the at least one narrow beam light emitter configured to emit a focused narrow beam of light to a corresponding charging zone disposed on a second portion of the vehicle, the focused narrow beam of light having a frequency within a predetermined frequency range; and at least one indicator that displays a visual indication of a location of the corresponding charging zone.

Another aspect of the disclosed embodiments is a vehicle system for providing a service to a mobile device includes a WiFi emitter configured to emit a plurality of WiFi signals, each of the plurality of WiFi signals corresponding to a respective zone within the vehicle, and a WiFi control module that selectively controls the WiFi emitter to emit one or more signals to respective zones. Each zone corresponds to a particular occupant area within the vehicle.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Mobile devices are ubiquitous with a user's day-to-day activities. A mobile device typically includes a modular voltage storage cell, such as a rechargeable battery. A user of a mobile device typically recharges the modular voltage storage cell when the user has access to an electrical outlet, such as a wall outlet in a home or office or a power outlet such as in a vehicle.

The mobile device is then connected to a charging cable. The charging cable may be connected to a charging receptacle in the electrical outlet. The modular voltage storage cell may be replenished and/or charged while the mobile device is connected to the electrical outlet. In some situations, traditional charging methods, such as those described above, may be inconvenient. For example, more than one user may desire to change a mobile device at the same time, a single user may desire to charge more than one mobile device at the same time (e.g., a smartphone and a tablet), the user or users may not have access to proper charging cables and/or charging receptacles, or other suitable situations. According, a system and method for photonic charging of mobile devices that includes wireless mobile device charging with in a relatively small or confined area, may be desirable.

Figure 1:
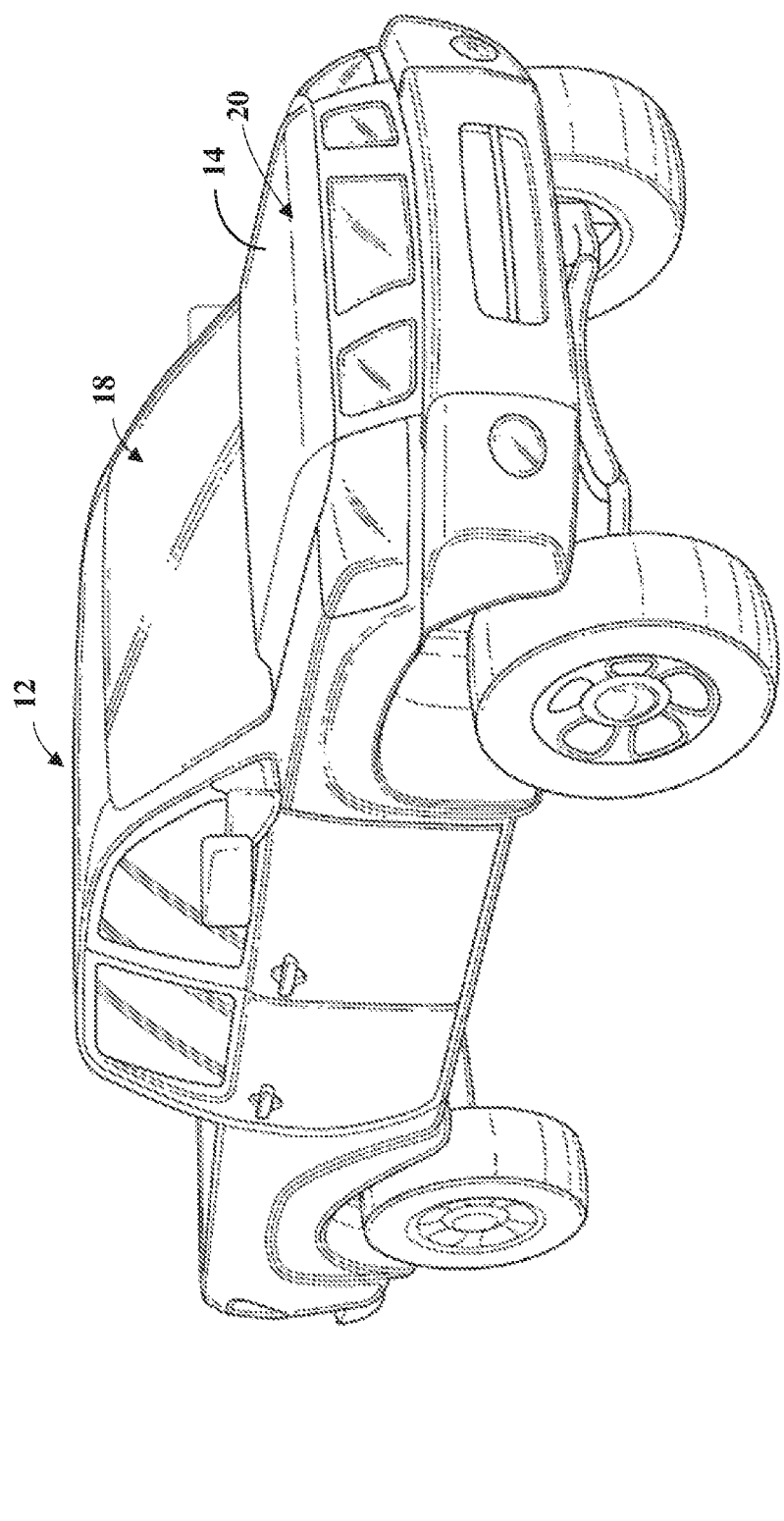
FIG. 1 generally illustrates a front perspective view of a vehicle according to the principles of the present disclosure.

FIG. 1 generally illustrates a front perspective view of a vehicle 10 according to the principles of the present disclosure. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood is in a first or open position and the hood 14 covers the engine compartment when the hood 14 is in a second or closed position.

The passenger compartment 18 is disposed rearward of the engine compartment 20. The vehicle 10 may include an internal combustion engine, one or more electric motors, and/or a combination thereof. In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses components of, for example, a compression ignition engine. The vehicle 10 may be an electric vehicle, a hybrid vehicle, an autonomous or semi-autonomous vehicle, or other suitable type of vehicle. The vehicle 10 may include additional or fewer features than those generally illustrated and/or disclosed herein. Additionally, or alternatively, the vehicle 10 may include a car, a truck, a sport utility vehicle, a plane, a boat, a train car, and/or other suitable mass transit or passenger vehicles.

Figure 2:
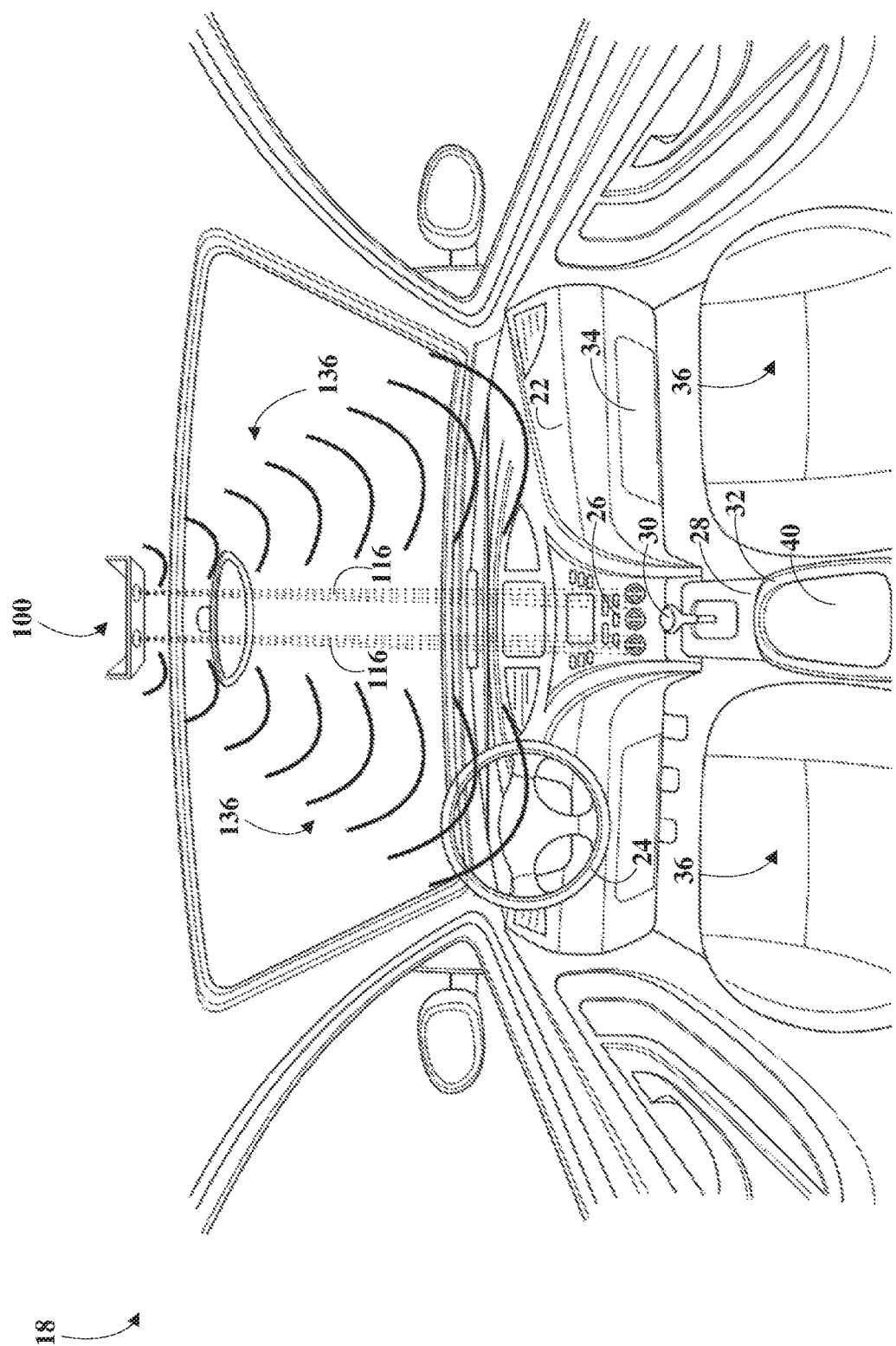
FIGS. 2 and 3 generally illustrate a passenger compartment of the vehicle generally illustrated in FIG. 1.
Figure 3:
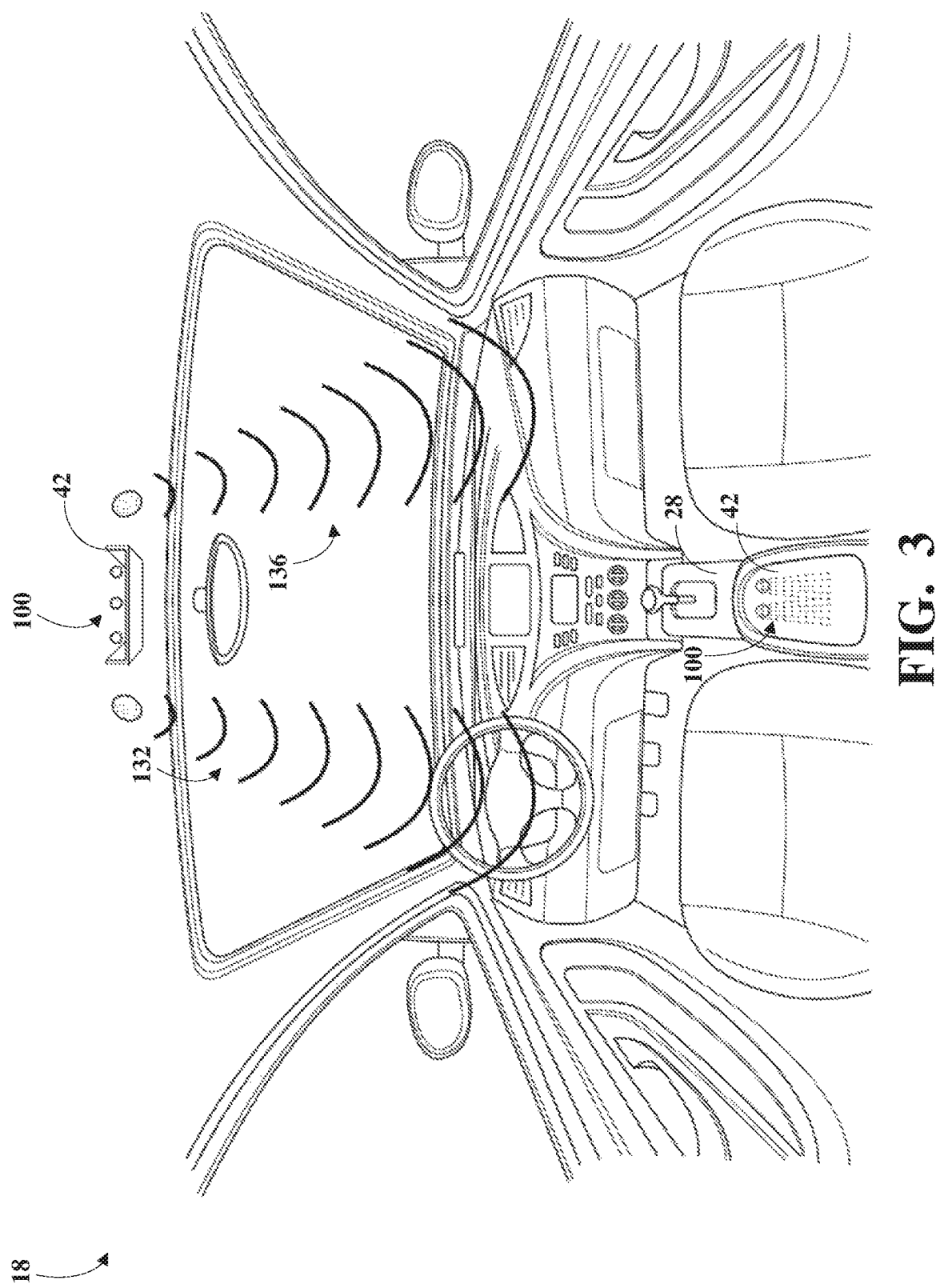

FIGS. 2 and 3 generally illustrate a vehicle passenger compartment, such as the vehicle passenger compartment 18, according to the principles of the present disclosure. The passenger compartment 18 includes a dashboard 22 and a steering wheel 24 disposed on the dashboard 22. The dashboard 22 includes one or more user interfaces 26. The user interfaces 26 may include a user interface for entertainment features within the vehicle 10, a user interface for climate control, a user interface for interior and/or exterior illumination, other suitable user interfaces, and/or a combination thereof. In some embodiments, the dashboard 22 includes one or more storage compartments 34.

The passenger compartment 18 includes a center console 28 disposed at or near a center portion of the passenger compartment 18. In some embodiments, the center console 28 includes a gear shifting interface 30 and an armrest 32. In some embodiments, the armrest 32 includes a storage compartment disposed beneath the armrest 32.

The passenger compartment 18 includes one or more seating zones 36. For example, the passenger compartment 18 may include a first seating zone 36 and a second seating zone 36. The first seating zone 36 may include a driver seating zone and a front passenger seating zone and the second seating zone 36 may include one or more rear passenger seating zones. In some embodiments, the first seating zone 36 includes a driver seating zone, the second seating zone 36 includes a front passenger seating zone, a third seating zone 36 includes a driver side rear passenger seating zone, and a forth seating zone 36 includes a passenger side rear passenger seating zone. The passenger compartment 18 may include fewer or more seating zones 36 than described herein.

In some embodiments, the passenger compartment 18 includes a photonic charging system 100. As will be described in detail, the system 100 is configured to provide photonic charging to replenish modular voltage storage cells (e.g., rechargeable batteries). While the system 100 is illustrated as being included in a passenger compartment of a vehicle, the system 100 may be a standalone system. For example, the system 100 may be disposed within an office, on a train or other mass transit vehicle, in a classroom, or other suitable location.

Figure 4:
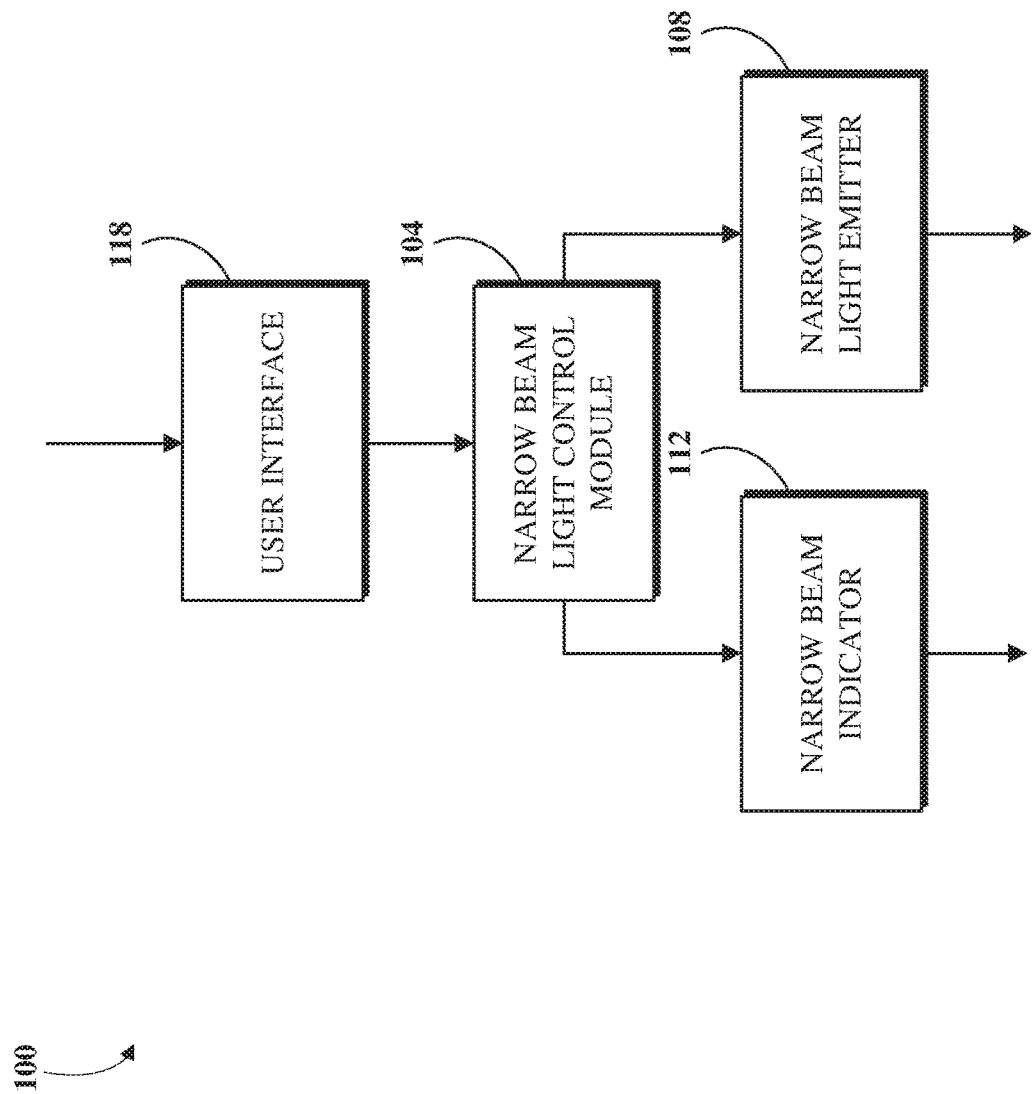
FIG. 4 is a functional block diagram of a photonic charging system according to the principles of the present disclosure.

FIG. 4 is a functional block diagram of a photonic charging system, such as the system 100, according to the principles of the present disclosure. In some embodiments, the system 100 may include a narrow beam light control module 104, a narrow beam light emitter 108, a narrow beam indicator 112, and a user control interface 116. The system 100 may include additional, fewer, and/or different modules and/or components than those illustrated and/or described herein.

The narrow beam light control module 104 may be configured to selectively control the narrow beam light emitter 108. For example, the narrow beam light control module 104 generates a control signal. The narrow beam light control module 104 communicates the control signal to the narrow beam light emitter 108. The narrow beam light emitter 108 emits a focused narrow beam of light 114, as is generally illustrated in FIG. 2, based on the control signal. The focused narrow beam of light 114 may include a light intensity and a frequency. The narrow beam light control module 104 may communicate the control signal to the narrow beam light emitter 108 in order to change a current state of the narrow beam light emitter 108. The narrow beam light emitter 108 may change the current state associated with the narrow beam light emitter 108 in response to receiving the control signal.

For example, the narrow beam light emitter 108 includes a first state and a second state. The first state of the narrow beam light emitter 108 includes a state where the narrow beam light emitter 108 is on and/or is emitting a focused narrow beam of light 114. The second state of the narrow beam light emitter 108 includes a state where the narrow beam light emitter 108 is off and/or is not emitting a focused narrow beam of light 114. When the narrow beam light emitter 108 receives the control signal and the narrow beam light emitter 108 is in the first state, the narrow beam light emitter 108 changes the current state to the second state (e.g., the narrow beam light emitter 108 changes the current state from on to off). Conversely, when the narrow beam light emitter 108 receives the control signal and the narrow beam light emitter 108 is in the second state, the narrow beam light emitter 108 changes the current state from the second state to the first state (e.g., the narrow beam light emitter 108 changes the current state from off to on).

In some embodiments, the control signal includes information indicating a light intensity. The narrow beam light emitter 108 emits a focused narrow beam of light 114 having an intensity equal to an intensity indicated by the control signal. In some embodiments, the control signal includes information indicating a light beam frequency. For example, the control signal may include a light beam frequency within a predetermined frequency range. The frequency range may include frequencies capable of providing far field photonic charging to a device having a modular voltage storage cell. For example, the frequency range may be 430 terahertz-770 terahertz. It should be understood that while only limited examples are described herein, the frequency range may include any suitable frequency. For example, the frequency range may be less than frequency ranges of far field charging microwaves or lasers.

The narrow beam light emitter 108 emits a focused narrow beam of light 114 having a frequency equal to a light beam frequency indicated by the control signal. For example, the narrow beam light emitter 108 may include and/or be in communication with an antenna. The antenna is configured to receive power and/or energy from a power source. The power source may include a vehicle battery of the vehicle 10 and/or other suitable power source. The antenna may include a coil of wire configured to generate a magnetic field, a metal plate that generates an electrical field, an antenna that radiates radio waves, a laser that generates a laser light, a microwave that generates a microwave field, other suitable antenna, or a combination thereof.

In some embodiments, the antenna is configured to convert the received power to a focused narrow beam of light 114 having a wavelength oscillating at a frequency indicated by the control signal. The narrow beam light emitter 108 is configured to emit the focused narrow beam of light 114 to a charging zone. The charging zone may be located within the passenger compartment 18. For example, as is generally illustrated in FIG. 2, the system 100 may be disposed on a first interior portion of the vehicle 10 and a charging zone 40 is disposed on a second interior portion of the vehicle 10. In some embodiments, the second interior portion is remotely located relative to the first interior portion. For example, the system 100 may be disposed adjacent to an upper portion of the passenger compartment 18, such as a roof liner, and the charging zone 40 may be disposed on a portion of the center console 28. In such an embodiment, the narrow beam light emitter 108 emits a focused narrow beam of light 114 downward toward the charging zone 40.

In some embodiments, the system 100 includes an indicator, such as a narrow beam indicator 112. The narrow beam indicator 112 may emit a visual indicator that indicates a location of the charging zone 40. In some embodiments, the visual indicator includes a light that illuminates the charging zone 40 in response to control signal. The narrow beam indicator 112 may include a light emitting diode, a pinpoint light emitting diode, other suitable light emitting indicator, and/or a combination thereof. In some embodiments, the visual indicator includes a symbol and/or pattern that is projected onto the charging zone 40 in order to indicate the location of the charging zone 40.

In some embodiments, the narrow beam light control module 104 communicates the control signal to the narrow beam indicator 112. The narrow beam indicator 112 may change a current state of the narrow beam indicator 112 in response to receiving the control signal, as is described above with respect to the narrow beam light emitter 108. In some embodiments, the narrow beam indicator 112 receives a control signal from the narrow beam light emitter 108. For example, the narrow beam light emitter 108 may communicate a control signal to the narrow beam indicator 112. The narrow beam indicator 112 may change a current state of the narrow beam indicator 112 in response to receiving the control signal. The control signal may indicate a current state of the narrow beam light emitter 108. The narrow beam indicator 112 changes the current state of the narrow beam indicator 112 to match a current state of the narrow beam light emitter 108.

The narrow beam indicator 112 indicates to a passenger within the passenger compartment a location of the charging zone 40. For example, the narrow beam indicator 112 may emit a pinpoint light onto a portion of the charging zone 40. The pinpoint light indicates to the passenger a location within the charging zone 40 to place a device having a modular voltage storage cell to be charged by the focused narrow beam of light 114 emitted by the narrow beam light emitter 108.

The device may include a mobile computing device, such as a smartphone, tablet computer, or other suitable mobile computing device. Additionally, or alternatively, the device may include other suitable devices other than mobile computing devices. The device includes a receiver. The receiver may include an antenna and/or other suitable receiver. The receiver is configured to receive the focused narrow beam of light 114 and to convert the narrow beam of light 114 into energy. For example, the receiver is configured to convert the focused narrow beam of light 114 generated by the antenna associated with the narrow beam light emitter 108 into energy suitable for charging a modular voltage storage cell associated with the device. The receiver communicates the energy to the modular voltage storage cell. The modular voltage storage cell is charged in response to receiving the energy from the receiver.

In some embodiments, the system 100 may be configured to generate a plurality of focused narrow beams of light 114. For example, the system 100 may include a plurality of narrow beam light emitters 108 and a plurality of narrow beam indicators 112 that emit focused narrow beams of light 114 and corresponding visual indicators respectively. In some embodiments, the narrow beam light emitter 108 is configured to emit a plurality of narrow beams of light 114. The system 100 may include a plurality of narrow beam indicators 112 that indicate corresponding ones of the focused narrow beams of light 114 or a single narrow beam indicator 112 that is configured to emit a plurality of visual indicators corresponding to the plurality of focused narrow beams of light 114. In some embodiments, the vehicle 10 may include a plurality of charging zones 40. The plurality of charging zones 40 may be disposed throughout the passenger compartment. Each charging zone 40 may receive focused narrow beams of light 114 from the system 100.

In some embodiments, the system 100 and the charging zone 40 may be disposed in a receptacle within the passenger compartment 18. As is generally illustrated in FIG. 3, a receptacle 42 may be disposed at or near the upper portion of the passenger compartment. In some embodiments, the receptacle 42 may be disposed on the center console 28, in a portion of a vehicle seat, in a portion of a vehicle door, in a rear portion of the vehicle 10, in another suitable portion of the vehicle 10, or a combination thereof. The vehicle 10 may include a plurality of receptacles 42 or a combination of one or more receptacles 42 and the system 100 and charging zone 40 generally illustrated in FIG. 2 (e.g., where the system 100 is dosed remotely from the charging zone 40). The receptacle 42 may include a pocket, ledge, shelf, and/or other suitable receptacle. The receptacle 42 is configured to hold, retain, or receive the device. For example, a passenger may insert a device into the receptacle 42. The receptacle 42 includes the system 100 and at least one charging zone 40. The modular voltage storage cell associated with the device is charged based on focused narrow beams of light 114 emitted toward the charging zone 40 within the receptacle 42.

In some embodiments, the system 100 includes a user interface 118. The user interface 118 may include a control knob disposed on a portion of the vehicle 10, a touch screen within the vehicle 10, an application interface accessible on a mobile computing device, other suitable user interfaces, or a combination thereof. A passenger may interact with the user interface 118 in order to control the narrow beam light control module 104. For example, the passenger may select from one or more options on the user interface 118. The options may include turning the narrow beam light emitter 108 on, turning the narrow beam light emitter 108 off, increasing an intensity and/or frequency of the focused narrow beam of light 114, decreasing an intensity and/or frequency of the focused narrow beam of light 114, selecting a desired visual indicator, turning on some of a plurality of narrow beam light emitters 108, turning off some of a plurality of narrow beam light emitters 108, other selectable options, or a combination thereof. In some embodiments, the passenger may select a color of a visual indicator, an intensity of light associated with a visual indicator, other suitable options associated with a visual indicator, or a combination thereof.

The narrow beam light control module 104 is configured to receive input from the user interface 118. The narrow beam light control module 104 selectively controls the narrow beam light emitter 108 and/or the narrow beam indicator 112 in response to the input received from the user interface 118. For example, a device placed on the charging zone 40 may be capable of a rapid charge and a trickle charge. The passenger may provide input to the user interface 118 that indicates whether to rapid charge the device or to trickle charge the device. In some embodiments, the system 100 may have a default charging mode (e.g., rapid charge mode or trickle charge mode). The system 100 may operate according to the default charging mode unless the input received from the user interface 118 indicates otherwise. In some embodiments, the narrow beam light control module 104 is configured to selectively control the narrow beam light emitter 108 and/or the narrow beam indicator 112 in response to an ignition of the vehicle 10 being in a start or run position.

In some embodiments, the narrow beam light control module 104 is configured to automatically detect characteristics associated with a device within the charging zone 40. For example, the narrow beam light control module 104 may communicate with a WiFi radio, a Bluetooth device, or other suitable communication devices of the device. The narrow beam light control module 104 may receive, from the device, information about the modular voltage storage cell of the device. The information may include a charge status, whether or not the modular voltage storage cell is capable of receiving a rapid charge, information about a user of the device, a frequency at which the modular voltage storage cell can be charged at, other suitable information, or a combination thereof. The narrow beam light control module 104 may control the narrow beam light emitter 108 based on the information received from the device.

In some embodiments, the system 100 may be configured to identify a position of the device on the charging zone 40. For example, the system 100 may include an infrared tracking device. The infrared tracking device may be configured to determine whether the device is properly aligned on the charging zone 40, such that, the device will receive the focused narrow beam of light 114. The system 100 may display an indication on the user interface 118 indicating that the device is properly or improperly positioned.

In some embodiments, the narrow beam light emitter 108 may be selectively positionable. For example, the narrow beam light emitter 108 may be attached to or disposed on a positionable base. A passenger may position the narrow beam light emitter 108 in order to redirect the focused narrow beam of light 114. Additionally, or alternatively, the narrow beam light emitter 108 may be attached to or disposed on motor controlled base. The narrow beam light control module 104 may position the narrow beam light emitter 108 in response to input received from the user interface 118, in response to information received from the device, in response to infrared tracking information, in response to other suitable input and/or information, or a combination thereof.

Figure 5:
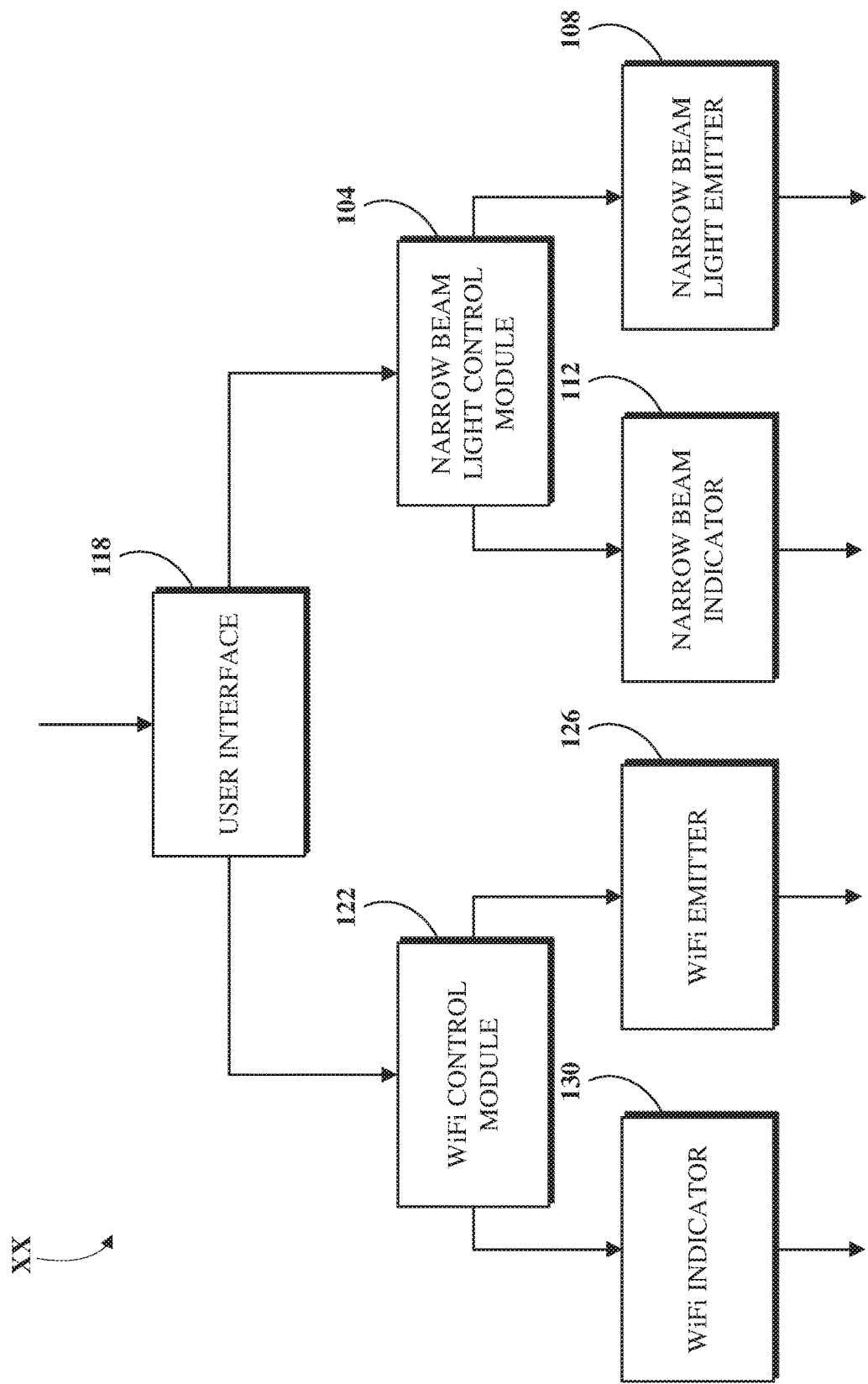
FIG. 5 is a functional block diagram of a photonic charging system including zoned WiFi according to the principles of the present disclosure.

FIG. 5 is a functional block diagram of a photonic charging system 100 including zoned WiFi according to the principles of the present disclosure. In some embodiments, the system 100 includes a zone WiFi. In some embodiments, the zoned WiFi may be separate from the system 100. The zone WiFi includes a WiFi control module 122, a WiFi emitter 126, and a WiFi indicator 130. The WiFi control module 122 is configured to selectively control the WiFi emitter 126. For example, the WiFi control module 122 generates a control signal and communicates the control signal to the WiFi emitter 126. The control signal may indicate whether to emit a WiFi signal. The WiFi emitter 126 generates a WiFi signal in response to receiving the control signal. The WiFi emitter 126 is configured to transmit the WiFi signal to a predetermined WiFi zone within the passenger compartment 18. For example, as is generally illustrated in FIGS. 2 and 3, the WiFi emitter 126 transmits a WiFi signal 134 to one or more of the seating zones 36. In some embodiments, each seating zone 36 within the vehicle 10 includes a corresponding WiFi zone. In some embodiments, the vehicle includes a front WiFi zone and rear WiFi zone. While only limited examples are described, the vehicle 10 may include any suitable combination of WiFi zones.

In some embodiments, the WiFi control module 122 may communicate with a plurality of WiFi emitters 126. Each WiFi emitter 126 may be configured to transmit a WiFi signal 136 to a corresponding WiFi zone within the vehicle 10. In some embodiments, the WiFi emitter 126 may be configured to transmit a plurality of WiFi signals 136 to a plurality of corresponding WiFi zones within the vehicle 10. The WiFi emitter 126 is configured to transmit a controlled, zoned WiFi signal 136. For example, the WiFi emitter 126 is configured to control an access perimeter of a corresponding WiFi signal 136, such that, a device within the access perimeter may access the WiFi signal 136 and a device outside of the access perimeter may not access the WiFi signal 136.

In some embodiments, the WiFi control module 122 selectively controls the WiFi indicator 130. The WiFi indicator 130 may include features similar to those described with respect to the narrow beam indicator 112. The WiFi indicator 130 is configured to display a visual indication of a location of a corresponding WiFi signal 136. The visual indicator may include any of the visual indicators described with respect to the narrow beam indicator 112.

Additionally, or alternatively, the WiFi indicator 130 may be configured to indicate whether a particular WiFi zone is active. For example, the WiFi control module 122 may receive input from the user interface 118. The input may include a selection of WiFi zones to activate (e.g., turn on), a selection of WiFi zones deactivate (e.g., turn off), or a combination thereof. The WiFi control module 122 generates a control signal indicating which WiFi zones to activate and/or deactivate to the WiFi emitter 126. The WiFi emitter 126 transmits WiFi signals 136 to activated WiFi zones and does not transmit WiFi signals 136 to deactivated WiFi zones. The WiFi control module 122 may communicate the control signal to the WiFi indicator 130. The WiFi indicator 130 provides a visual indication to each of the activated WiFi zones based on the control signal.

In some embodiments, the zoned WiFi may include a plurality of WiFi indicators 130 corresponding to each WiFi zone within the vehicle 10 or a signal WiFi indicator configured to provide visual indications to each WiFi zone. In some embodiments, the zoned WiFi may omit the WiFi indicator. In some embodiments, the zoned WiFi may utilize the narrow beam indicator 112 to provide visual indications to corresponding WiFi zones. In some embodiments, the WiFi control module 122 may deactivate one or more WiFi zones when a transmission associated with the vehicle 10 is in a drive gear. For example, when the transmission is in a gear other than park, the WiFi control module 122 may be configured to deactivate a driver seating zone 36. While only limited examples are described herein, the WiFi control module 122 may activate and/or deactivate one or more WiFi zones based on other suitable information received from various components of the vehicle 10, input from the user interface 118, information received from a device (e.g., a mobile computing device) within the vehicle 10, or from other suitable sources.

Figure 6:
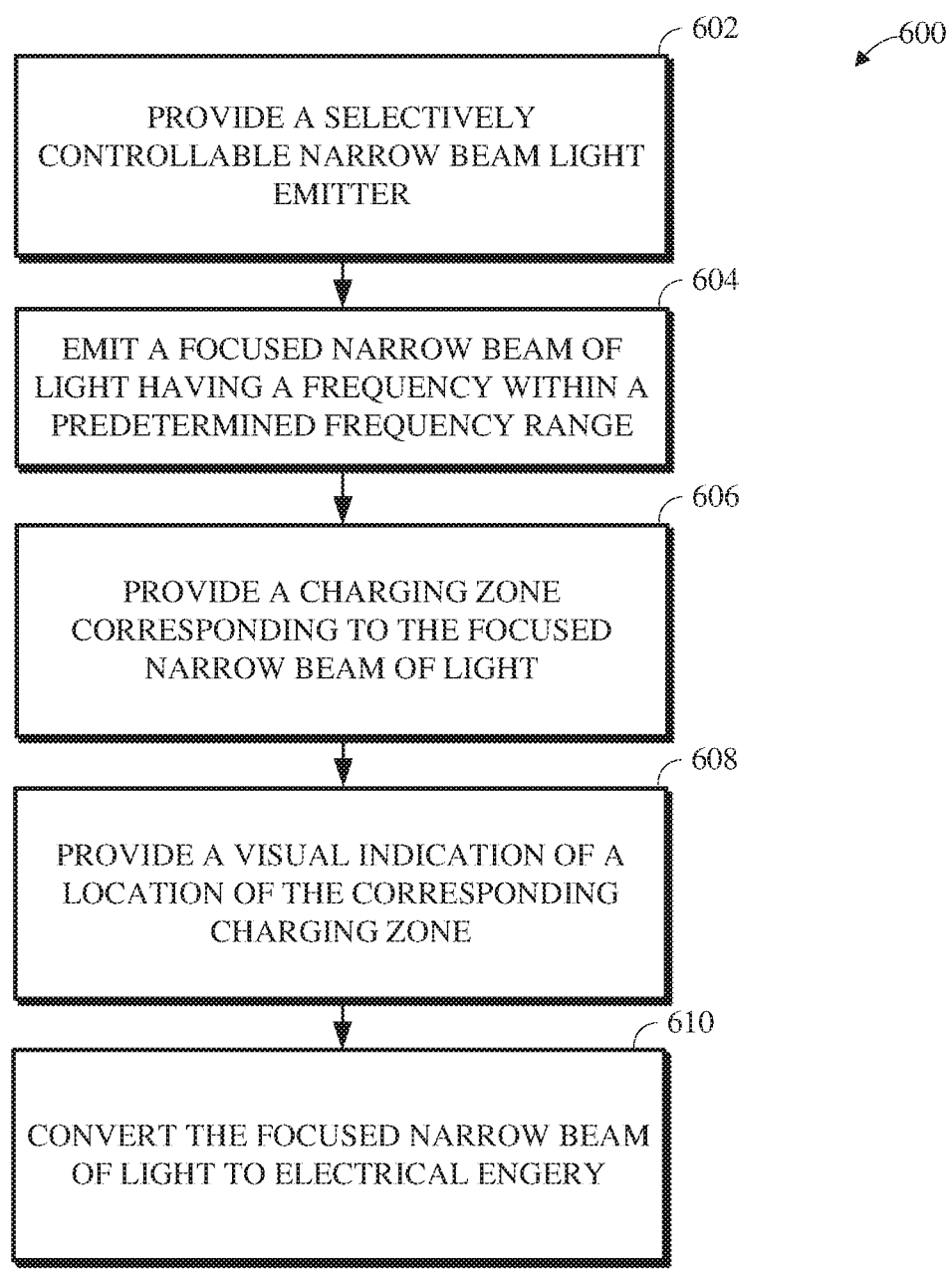
FIG. 6 is a flowchart of an example method for providing photonic charging according to the principles of the present disclosure.

FIG. 6 is a flowchart of an example method 600 for providing photonic charging according to the principles of the present disclosure. At 602, the method 600 provides a selectively controllable narrow beam light emitter. For example, as described above, the narrow beam light emitter includes the narrow beam light emitter 108. At 604, the method 600 emits a focused narrow beam of light having a frequency within a predetermined frequency range. For example, the narrow beam light emitter 108 emits the focused narrow beam of light 114.

At 606, the method 600 provides a charging zone corresponding to the focused narrow beam of light. For example, as described above, the charging zone includes the charging zone 40. In some embodiments, the narrow beam light emitter 108 is disposed on a first interior portion of the vehicle 10 and the charging zone 40 is disposed on a second interior portion of the vehicle 10 remotely located from the first interior portion. In some embodiments, the narrow beam light emitter 108 and the charging zone 40 are disposed in a receptacle 42, as described above.

At 608, the method 600 provides a visual indicator of a location of the corresponding charging zone. For example, the narrow beam indicator 112 provides a visual indication of a location of the charging zone 40. The visual indicator may include a light that illuminates the charging zone 40, a pinpoint light that illuminates the charging zone 40, a symbol projected onto the charging zone 40, a pattern projected onto the charging zone 40, other suitable visual indicators, or a combination thereof. At 610, the method 600 converts the focused narrow beam of light to electrical energy. For example, a device having a receiver configured to convert the focused narrow beam of light 114 into energy, converts the focused narrow beam of light 114 into energy. A modular voltage storage cell associated with the device is charged responsive to the converted energy.

All or a portion of the implementations of the systems and methods described herein can be implemented using a general-purpose computer/processor with a computer program that, when executed, carries out any of the respective methods, algorithms, or instructions described herein. In addition, or alternatively, for example, a special-purpose computer/processor can be utilized, which can include specialized hardware for carrying out any of the methods, algorithms, or instructions described herein.

The implementations of computing devices as described herein (and the algorithms, methods, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array, (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and methods can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and methods could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC) or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and methods and does not pose a limitation on the scope of the systems and methods unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and methods and are not intended to otherwise limit the scope of the systems and methods in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and methods unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all methods described herein are performable in any suitable order unless clearly indicated otherwise by the context.

All references, including publications, patent applications, and patents, cited herein are hereby incorporated by reference to the same extent as if respective references were individually and specifically indicated as incorporated by reference and were set forth in its entirety herein.

The above-described implementations have been described in order to facilitate easy understanding of the present systems and methods, and such descriptions of such implementations do not limit the present systems and methods. To the contrary, the present systems and methods are intended to cover various modifications and equivalent arrangements included within the scope of the appended claims, which scope is to be accorded the broadest interpretation as is permitted by law so as to encompass all such modifications and equivalent arrangements.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A vehicle system for providing a service to a mobile device within a vehicle, comprising:
   a WiFi emitter configured to emit a plurality of WiFi signals, each of the plurality of WiFi signals corresponding to a respective zone within the vehicle; and
   a WiFi control module that selectively controls the WiFi emitter to emit one or more signals to respective zones, wherein each zone corresponds to a particular occupant area within the vehicle, wherein the WiFi emitter is configured to project a zone-specific signal for each respective zone, the zone-specific signal accessible by the mobile device only when the mobile device is within the respective zone.

2. The vehicle system of claim 1, wherein each particular occupant area is a different row of seats in the vehicle.

3. The vehicle system of claim 1, wherein each particular occupant area is a different individual seat in the vehicle.

4. The vehicle system of claim 1, further comprising at least one WiFi indicator that displays a visual indication of an active WiFi signal.

5. The vehicle system of claim 4, wherein the at least one WiFi indicator includes a light emitting diode configured to emit a light that illuminates a corresponding active WiFi signal.

6. The vehicle system of claim 1, further comprising a user interface through which an occupant can instruct the WiFi control module to activate or de-activate zones.

7. The vehicle system of claim 1, wherein the WiFi control module is configured to deactivate a WiFi signal corresponding to a driver's zone when an operation of the vehicle is detected.

8. The vehicle system of claim 7, wherein the detected operation of the vehicle is the vehicle being in a gear other than park.

9. The vehicle system of claim 1, wherein the WiFi emitter is located adjacent a roof liner of the vehicle, the WiFi emitter configured to project the WiFi signals in a downward direction.

10. The vehicle system of claim 1, wherein the WiFi emitter is centrally located in a lateral direction of the vehicle and centrally located in a passenger compartment of the vehicle in a longitudinal direction of the passenger compartment.

11. The vehicle system of claim 1, further comprising:
    a narrow beam light control module that selectively controls at least one narrow beam light emitter, the at least one narrow beam light emitter configured to emit a focused narrow beam of light to a corresponding charging zone.

12. The vehicle system of claim 1, further comprising: a narrow beam light emitter configured to visually indicate a charging zone.

13. A vehicle system for providing a service to a mobile device within a vehicle, comprising:
a narrow beam light control module that selectively controls at least one narrow beam light emitter, the at least one narrow beam light emitter configured to emit a focused narrow beam of light to a corresponding charging zone, the focused narrow beam of light having a frequency within a predetermined frequency range; and
a WiFi control module that selectively controls a WiFi emitter to emit one or more signals to respective zones within the vehicle, wherein each zone corresponds to a particular occupant area within the vehicle.

14. The vehicle system of claim 13, wherein each particular occupant area is a different row of seats in the vehicle.

15. The vehicle system of claim 13, wherein each particular occupant area is an individual seat in the vehicle.

16. The vehicle system of claim 13, further comprising at least one WiFi indicator that displays a visual indication of an active WiFi signal.

17. The vehicle system of claim 13, further comprising a user interface through which an occupant can instruct the WiFi control module to activate or de-activate zones.

18. The vehicle system of claim 13, wherein the at least one narrow beam light emitter is disposed on a first interior portion of the vehicle and the corresponding charging zone is located on a second interior portion of the vehicle that is remotely located from the first interior portion of the vehicle.

19. The system of claim 13, wherein the at least one narrow beam light emitter and the corresponding charging zone are disposed in a charging receptacle.

20. A vehicle system for providing a service to a mobile device within a vehicle, comprising:
a WiFi emitter configured to emit a plurality of WiFi signals, each of the plurality of WiFi signals corresponding to a respective zone within the vehicle;
a WiFi control module that selectively controls the WiFi emitter to emit one or more signals to respective zones, wherein each zone corresponds to a particular occupant area within the vehicle; and
a narrow beam light emitter configured to emit a focused narrow beam of light to each respective zone.

* * * * *